US008374152B2

United States Patent
Aoyama et al.

(10) Patent No.: US 8,374,152 B2
(45) Date of Patent: Feb. 12, 2013

(54) CELL SELECTION SYSTEM, CELL SELECTION METHOD, AND MOBILE TERMINAL

(75) Inventors: Takahisa Aoyama, Kanagawa (JP); Jun Hirano, Kanagawa (JP); Takashi Aramaki, Osaka (JP); Akito Fukui, Kanagawa (JP)

(73) Assignee: Panasonic Corporation, Osaka (JP)

( * ) Notice: Subject to any disclaimer, the term of this patent is extended or adjusted under 35 U.S.C. 154(b) by 401 days.

(21) Appl. No.: 12/739,883

(22) PCT Filed: Aug. 22, 2008

(86) PCT No.: PCT/JP2008/002274
§ 371 (c)(1),
(2), (4) Date: Apr. 26, 2010

(87) PCT Pub. No.: WO2009/054086
PCT Pub. Date: Apr. 30, 2009

(65) Prior Publication Data
US 2010/0278146 A1    Nov. 4, 2010

(30) Foreign Application Priority Data
Oct. 26, 2007    (JP) .................................. 2007-278434

(51) Int. Cl.
*H04W 4/00* (2009.01)
*H04W 36/00* (2009.01)
(52) U.S. Cl. ...................................... 370/331; 455/436
(58) Field of Classification Search ........................ None
See application file for complete search history.

(56) References Cited

U.S. PATENT DOCUMENTS

| | | | |
|---|---|---|---|
| 6,510,146 B1 | 1/2003 | Korpela et al. | |
| 7,898,997 B2 * | 3/2011 | Lee et al. | 370/311 |
| 8,204,502 B2 * | 6/2012 | Khetawat et al. | 455/436 |
| 2006/0092872 A1 * | 5/2006 | Lee et al. | 370/328 |
| 2009/0088160 A1 * | 4/2009 | Pani et al. | 455/436 |

FOREIGN PATENT DOCUMENTS

| | | |
|---|---|---|
| JP | 11-75237 | 3/1999 |
| JP | 2006-135991 | 5/2006 |

OTHER PUBLICATIONS

Translation of the International Preliminary Report on Patentability and Written Opinion issued Jun. 1, 2010 in International (PCT) Application No. PCT/JP2008/002274.
International Search Report issued Nov. 25, 2008 in International (PCT) Application No. PCT/JP2008/002274.

(Continued)

*Primary Examiner* — Robert Scheibel
(74) *Attorney, Agent, or Firm* — Wenderoth, Lind & Ponack, L.L.P.

(57) ABSTRACT

A cell selection system selects a cell to be used for communications by a mobile terminal in a network having a cell of a mobile phone network and WLAN cells included in the cell. Broadcast information including cell selection information is transmitted in the cell of the mobile phone network. This cell selection information has cell change judgment parameters whose patterns are less than the WLAN cells. The mobile terminal reads the cell selection information from the broadcast information of the mobile phone network, determines a parameter to be used for the judgment on cell selection of a WLAN cell, and judges whether the cell can be changed or not. The cell reselection system restricts the amount of data in the broadcast information even with an increase in the number of WLAN cells included in the cell of the mobile phone network.

15 Claims, 17 Drawing Sheets

OTHER PUBLICATIONS

3GPP TS 25.331 V7.4.0, "Radio Resource Control (RRC); Protocol specification", Mar. 2007.
3GPP TS 25.304 V7.2.0, "User Equipment (UE) procedures in idle mode and procedures for cell reselection in connected mode", Jun. 2007.
3GPP TR 36.938 V0.4.0, "Improved network controlled mobility between E-UTRAN and 3GPP2/mobile WiMAX radio technologies", Oct. 2007.

* cited by examiner

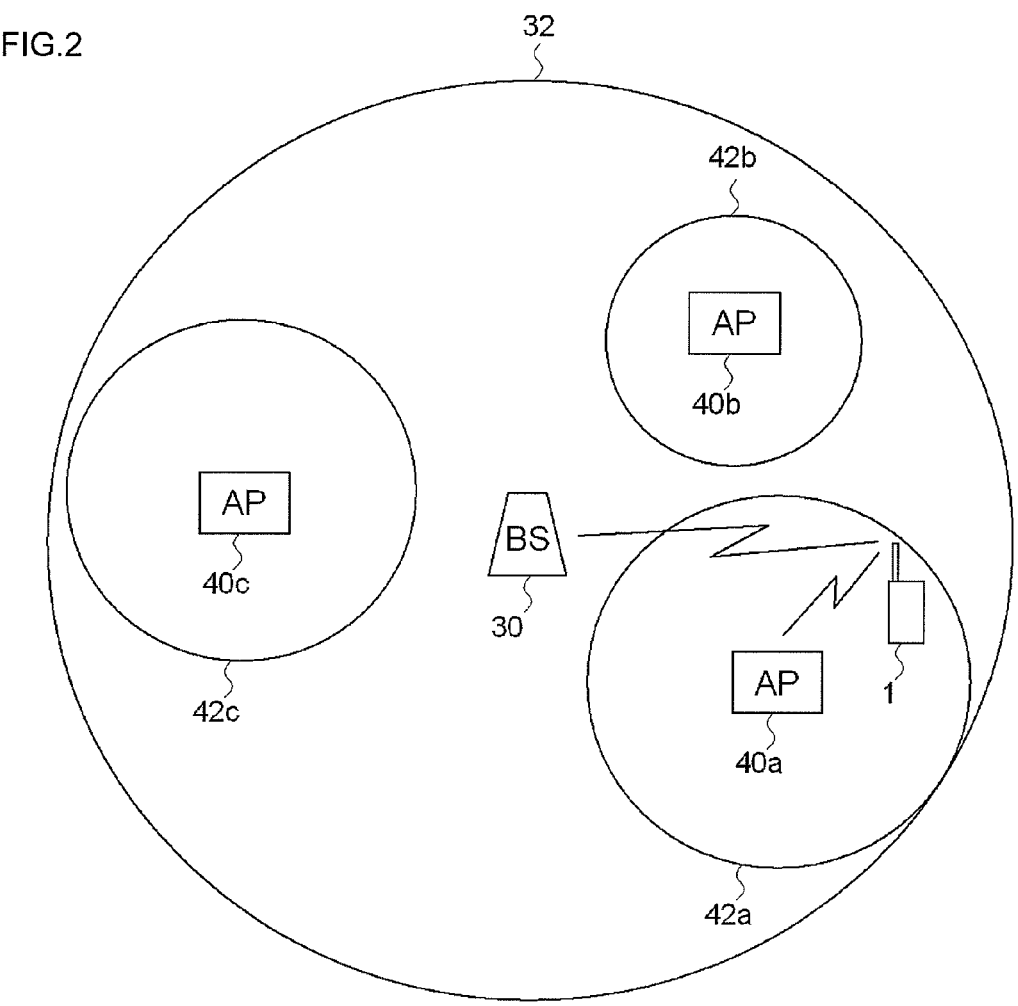

FIG.3B

| Ssearch | Qrxlevmin | Qhyst | Treselection | PATTERN 1 | | PATTERN 2 | |
|---|---|---|---|---|---|---|---|
| | | | | Offset | Scaling factor | Offset | Scaling factor |
| AAA | BBB | CCC | DDD | WWW | XXX | YYY | ZZZ |

FIG.3D

| Ssearch | Qrxlevmin | Qhyst | Treselection | AP1 | | AP2 | | AP3 | |
|---|---|---|---|---|---|---|---|---|---|
| | | | | Offset | Scaling factor | Offset | Scaling factor | Offset | Scaling factor |
| AAA | BBB | CCC | DDD | YYY | ZZZ | WWW | XXX | YYY | ZZZ |

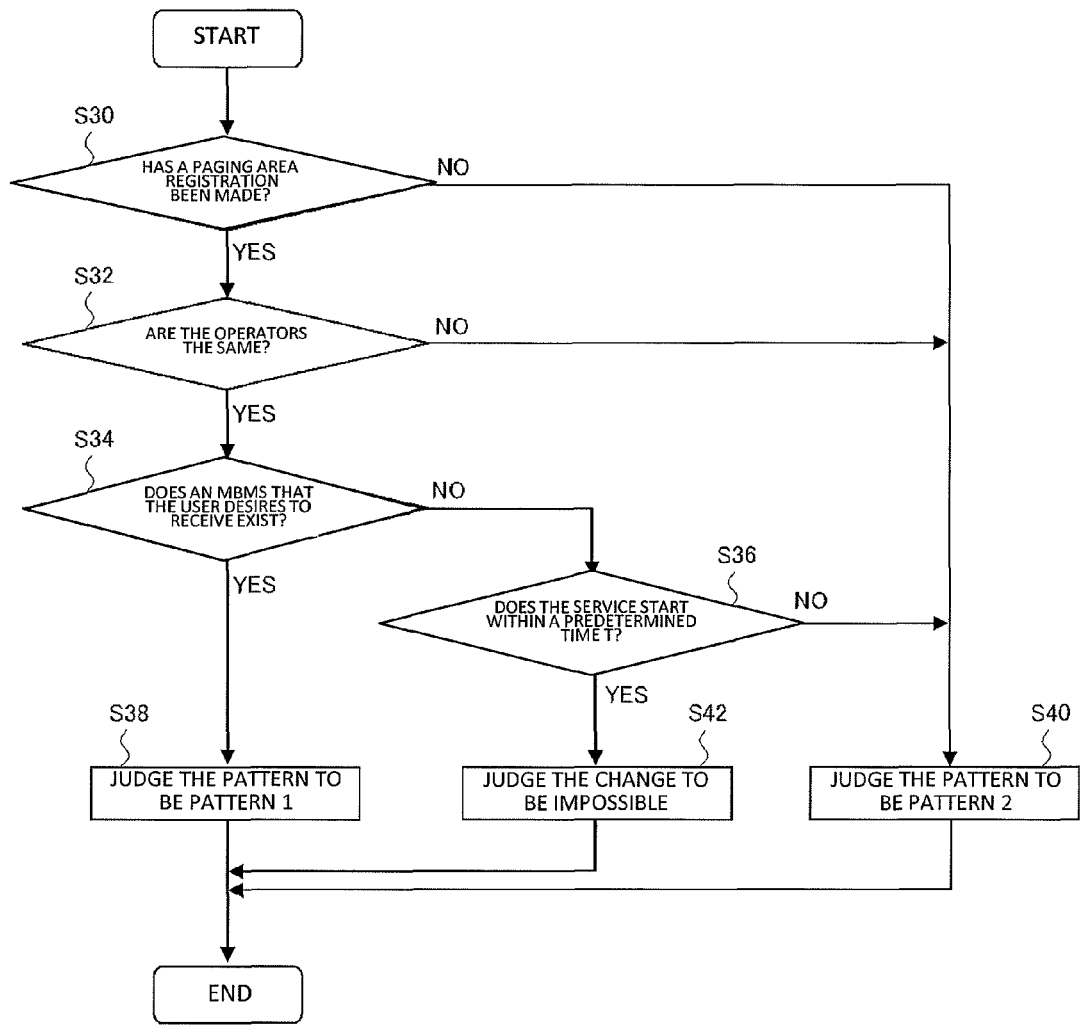

FIG.6B

| OPERATORS | |
|---|---|
| SAME | DIFFERENT |
| PATTERN 1 | PATTERN 2 |

FIG.6C

| MBMS THAT THE USER DESIRES TO RECEIVE | | | |
|---|---|---|---|
| EXIST | | NOT EXIST | |
| TIME TO THE SERVICE START TIME, t < THRESHOLD T? | | TIME TO THE SERVICE START TIME, t < THRESHOLD T? | |
| YES | NO | YES | NO |
| PATTERN 1 | PATTERN 2 | IMPOSSIBLE TO CHANGE | PATTERN 1 |

| Ssearch | Qrxlevmin | Qhyst | Treselection |
|---|---|---|---|
| AAA | BBB | CCC | DDD |

FIG.11C

| AP INFORMATION | OFFSET | SCALING FACTOR |
|---|---|---|
| | YYY | ZZZ |

CELL SELECTION SYSTEM, CELL SELECTION METHOD, AND MOBILE TERMINAL

RELATED APPLICATIONS

This application claims the benefit of Japanese Patent Application No. 2007-278434 filed on Oct. 26, 2007 in Japan, the contents of which are incorporated herein by reference.

BACKGROUND OF THE INVENTION

1. Technical Field

The present invention relates to a cell selection system for selecting a cell to be used for communications by a mobile terminal supporting a plurality of communications protocols.

2. Background Art

One major objective of LTE (Long Term Evolution)/SAE (System Architecture Evolution) being standardized in 3GPP is to support a plurality of RATs (radio access technologies). There are many types of RATs, such as UTRAN, GERAN, E-UTRAN, WLAN 3GPP access system, and non-3GPP access system. Each of the plurality of RATs has different properties (coverage, transmission rate, cost of introduction and operation, etc.).

FIG. 14 shows an example of coverages of a plurality of RATs. It can be seen that each RAT has a different coverage. FIG. 14 shows that the coverage of a GPRS network, which supports: GSM (Global System for Mobile)/GPRS (General Packet Radio Service), which is a cellular system having been used for a long time in Europe, the United States, and the like; and UMTS (Universal Mobile Telecommunications System), which is newly used particularly in Japan and the like, is wide, that the coverage of an Evolved network, which has been newly introduced, is narrower, and that the coverage of a WLAN, which is used for a hot spot or the like, is further narrower. Each RAT also has a different transmission rate; for example, WLAN>E-UTRAN (Evolved UMTS Radio Access Network: a general term for wireless equipment on the network side in Evolved networks (including base stations))>UTRAN (UMTS Radio Access Network: a general term for wireless equipment on the network side of UMTS in GPRS networks (including base stations and RNCs (Radio Network Controllers))).

A technology for supporting a plurality of RATs is desired in order to effectively utilize such properties that differ from RAT to RAT. Supporting a plurality of RATs will provide, for example, a choice of using a UTRAN, a GPRS network having a wide coverage, when a terminal moves at high speed, using a WLAN when the frequency of movement is low but a high-speed communication is required, and the like.

In UMTS and LTE, which are specified by 3GPP, mobile control is performed in which a terminal determines a cell to connect to when the terminal is in an idle mode. For example, if a terminal can communicate with both a cell of a mobile phone network and a cell of a WLAN, the terminal chooses which cell to communicate through. The operation of a terminal selecting a cell is called "cell reselection." Cell reselection is carried out by a terminal receiving broadcast information transmitted from a base station, and performing mobile control in accordance with cell reselection information included in the broadcast information. Since the selection of a cell is carried out in accordance with cell reselection information included in broadcast information, a base station can control the movement of a terminal with the cell reselection information that the base station includes in the broadcast information.

Currently, the operation of cell reselection in LTE is under discussion and remains undefined. The basic principle of the operation of reselection is expected to follow the operation in UMTS. The operation of cell reselection in UMTS will be described here.

Information related to cell reselection is transmitted mainly in SIB (System Information Block) 3 and SIB 4 of broadcast information. The difference between SIBs 3 and 4 here is that SIB 3 is used for both a terminal being in an idle mode and a terminal being in a connected mode whereas SIB 4 is used only for a terminal being in a connected mode. This is because, in UMTS, there is a terminal state where reselection is performed even in a connected mode (RRC states CELL_FACH, CELL_PCH, and URA_PCH). In LTE, however, cell reselection is not supposed to be performed outside an idle mode, and therefore only one SIB is used for transmission of cell reselection information. Information on a neighboring cell is notified of by SIBs 11 and 12. The relation between SIBs 11 and 12 is the same as that between SIBs 3 and 4.

Main parameters used for judgment about cell reselection will be described here. Main parameters include "Cell selection and reselection quality measure," "Ssearch," "Qrxlevmin/Qqualmin," "Qhyst," "Treselection," "Scaling factor," and "Cell Info." Each parameter will be described next.

FIG. 15 illustrates parameters used for judgment about cell reselection. "Cell selection and reselection quality measure" is an instruction on a measuring method used for performing cell selection and cell reselection. In UMTS, it is a parameter to indicate CPICH Ec/No or CPICH RSCP.

"Ssearch" is a radio field intensity parameter to judge whether the quality of a currently selected (which is called "camp on" in 3GPP) cell is to be judged or not. If a terminal were to perform detection and monitoring of its neighboring cell all the time, the terminal would consume much battery. The quality of a currently selected cell is compared with the parameter "Ssearch," and the detection and monitoring of the neighboring cell is not performed when the quality of the current cell is better than the parameter "Ssearch." As shown in FIG. 15, if the radio field intensity in a currently selected cell (change source) is higher than the parameter "Ssearch," another cell (change destination) is not searched for; and the search for another cell starts when the radio field intensity in the current cell becomes equal to or lower than the parameter "Ssearch" at Time T1.

"Qrxlevmin/Qqualmin" is a radio field intensity parameter to judge whether a detected cell should be monitored or not. A cell whose radio field intensity is lower than this parameter is judged not to require monitoring. As shown in FIG. 15, a cell to be monitored as a candidate change destination requires that the radio field intensity be equal to or higher than the parameter "Qrxlevmin."

"Qhyst" is a radio field intensity parameter that is set in order to avoid a so-called "ping-pong state." The "ping-pong state" is the following phenomenon. For example, when there is a terminal near the boundary of two cells, the intensities of radio waves received from the two cells may be almost equal. In this case, if a process were to be performed in which one cell is changed to the other whose radio field intensity is even a little higher than the one, the cell change might frequently occur. In order to prevent this phenomenon, the reception quality of a detected cell is compared with the value of the reception quality of a currently selected cell added with the parameter "Qhyst," and the change is controlled not to be performed unless the reception quality of the detected cell is better than the reception quality of the currently selected cell by the parameter "Qhyst" or more.

"Treselection" is a time parameter to avoid a frequent occurrence of cell changes when there are significant fluctuations in the reception quality of a terminal. A terminal performs the cell change when a state, in which the reception quality of a detected cell is better than the value of the reception quality of a currently selected cell added with the above-mentioned parameter "Qhyst," has continued for a time corresponding to the parameter "Treselection." That is, as shown in FIG. 15, if the radio field intensity in a detected cell becomes greater than the value of the radio field intensity in a currently selected cell added with the parameter "Qhyst" at Time T2, the mobile terminal measures the time for which the state continues, and performs the cell change at Time T3 when the duration becomes equal to or greater than the parameter "Treselection."

"Scaling factor" is a parameter to change the value of "Treselection" in accordance with the moving speed of a terminal. The value of "Treselection" is reduced for fast-moving terminals, since they require a rapid cell reselection. For that purpose, the value of "Treselection" is changed by means of the parameter "Scaling factor" if a terminal is judged to be moving at high speed. Whether a terminal is moving at high speed or not can be judged by the number of cell changes per unit time or the like.

"Cell Info" is a parameter to notify a terminal of information on another cell. The main pieces of information include: "Frequency," which notifies of the frequency band of the other cell; "Scrambling code," which indicates the code under which the other cell is being operated; and "Cell individual offset," which notifies, by means of an offset, of the degree of ease with which the cell is selected. "Cell individual offset" is notified of in SIB 11.

As seen above, a detailed mobile control could be performed on a terminal being in an idle mode by transmitting various parameters in UMTS (LTE also is thought to be going to have an operation fairly close to that in UMTS).

Non-patent document 1: 3GPP TS 25.331 V7.4.0, "Radio Resource Control (RRC); Protocol specification"

Non-patent document 2: 3GPP TS 25.304 V7.2.0, "User Equipment (UE) procedures in idle mode and procedures for cell reselection in connected mode"

Non-patent document 3: 3GPP TR 36.938 V0.4.0, "Improved network controlled mobility between E-UTRAN and 3GPP2/mobile WiMAX radio technologies"

SUMMARY OF THE INVENTION

As described above, it is conceivable that also in LTE a base station can perform mobile control of a terminal by having information for cell reselection included in broadcast information. However, it is assumed that the broadcast information becomes voluminous as cells of other RATs included in a cell of LTE or the like increase. Particularly, in a case where WLAN, WiMAX, and other non-3GPP access systems are used as a kind of hot spot, a plurality of access points (hereinafter referred to as "APs") with different properties exist in one cell. The different properties include, for example: (1) difference of AP management entities (operator itself, service company affiliated with the operator, mall, enterprise, school, etc.); (2) difference in service area (area itself covered by an AP, how many the APs are and how wide the areas are, etc.); (3) difference in frequency band (20 MHz, 15 MHz, 10 MHz, . . . ); and (4) difference in supported service (data transmission only, with a voice call, with an MBMS, or the like). If broadcast information for mobile control were to be transmitted with consideration for the above-described difference in properties, the broadcast information would become voluminous. Additionally, when an AP were to be newly installed, the broadcast information would have to be updated in order to have information included for cell reselection for the new AP, and thus the operation would be complicated.

In view of the above, a purpose of the invention is to provide a cell reselection system that can restrict the amount of data included in broadcast information in a mobile phone network, such as LTE, and appropriately select a cell even with an increase in the number of cells of other networks existing within the cell of the mobile phone network.

A cell selection system of the invention is for selecting a cell to be used for communications by a mobile terminal in a network having a first cell and a plurality of second cells which are included in the first cell and a communications protocol for which is different from that for the first cell, the mobile terminal supporting communications protocols for both the first and second cells, where broadcast information including cell selection information having cell change judgment parameters whose patterns are less than the number of the second cells is transmitted in the first cell, and where the mobile terminal receives the broadcast information of the first cell and broadcast information of one of the second cells; reads the cell selection information from the broadcast information of the first cell; determines, from the plurality of patterns of parameters included in the read cell selection information, a parameter to be used for judgment on cell selection to the second cell concerned based on the broadcast information of the second cell; and judges by the determined parameter whether the first cell can be changed to the second cell or not.

A cell selection system of another aspect of the invention is for selecting a cell to be used for communications by a mobile terminal in a network having a first cell and a plurality of second cells which are included in the first cell and a communications protocol for which is different from that for the first cell, the mobile terminal supporting communications protocols for both the first and second cells, where broadcast information including cell selection information comprising a common parameter that is commonly used for judgment on cell selection to all the second cells is transmitted in the first cell, where, in each of the second cells, broadcast information including an individual parameter that is individually used for judgment on cell selection to the second cell concerned is transmitted, and where the mobile terminal receives the broadcast information of the first cell and the broadcast information of one of the second cells; reads the common parameter from the broadcast information of the first cell; reads the individual parameter from the broadcast information of the second cell; and judges by the common and individual parameters whether the first cell can be changed to the second cell or not.

A cell selection method of the invention is for selecting a cell to be used for communications by a mobile terminal in a network having a first cell and a plurality of second cells which are included in the first cell and a communications protocol for which is different from that for the first cell, the mobile terminal supporting communications protocols for both the first and second cells, and the cell selection method comprises the steps of: transmitting, in the first cell, broadcast information including cell selection information having cell change judgment parameters whose patterns are less than the number of the second cells; transmitting broadcast information in the second cells; the mobile terminal receiving the broadcast information of the first cell and the broadcast information of one of the second cells; the mobile terminal reading the cell selection information from the broadcast information of the first cell; the mobile terminal determining, from the plurality of patterns of parameters included in the cell selection information, a parameter to be used for judgment on cell selection to the second cell concerned based on the broadcast information of the second cell; the mobile terminal judging by the determined parameter whether the first cell can be changed to the second cell or not; and selecting the first cell as the cell to be used for communications by the mobile terminal if the change is judged to be impossible in the change go/no-go judgment, and selecting the second cell as the cell to be used for communications by the mobile terminal if the change is judged to be possible.

A cell selection method of another aspect of the invention is for selecting a cell to be used for communications by a mobile terminal in a network having a first cell and a plurality of second cells which are included in the first cell and a communications protocol for which is different from that for the first cell, the mobile terminal supporting communications protocols for both the first and second cells, and the cell selection method comprises the steps of: transmitting, in the first cell, broadcast information including cell selection information comprising a common parameter that is commonly used for judgment on cell selection to all the second cells; transmitting, in each of the second cells, broadcast information including an individual parameter that is individually used for judgment on cell selection to the second cell concerned; the mobile terminal receiving the broadcast information of the first cell and the broadcast information of one of the second cells; the mobile terminal reading the common parameter from the broadcast information of the first cell; the mobile terminal reading the individual parameter from the broadcast information of the second cell; the mobile terminal judging by the common and individual parameters whether the first cell can be changed to the second cell or not; and selecting the first cell as the cell to be used for communications by the mobile terminal if the change is judged to be impossible in the change go/no-go judgment, and selecting the second cell as the cell to be used for communications by the mobile terminal if the change is judged to be possible.

A mobile terminal of the invention is used in a network having a first cell and a plurality of second cells which are included in the first cell and a communications protocol for which is different from that for the first cell, the mobile terminal supports communications protocols for both the first and second cells, and the mobile terminal comprises: a first broadcast information receiver for receiving broadcast information of the first cell including cell selection information having cell change judgment parameters whose patterns are less than the number of the second cells; a second broadcast information receiver for receiving broadcast information of one of the second cells; a broadcast information processor for reading the cell selection information from the broadcast information of the first cell and determining, from the plurality of patterns of parameters included in the read cell selection information, a parameter to be used for judgment on cell selection to the second cell concerned based on the broadcast information of the second cell; and a cell change controller for judging by the determined parameter whether the first cell can be changed to the second cell or not.

A mobile terminal of another aspect of the invention is used in a network having a first cell and a plurality of second cells which are included in the first cell and a communications protocol for which is different from that for the first cell, the mobile terminal supports communications protocols for both the first and second cells, and the mobile terminal comprises: a first broadcast information receiver for receiving broadcast information of the first cell including cell selection information comprising a common parameter that is commonly used for judgment on cell selection to all the second cells; a second broadcast information receiver for receiving broadcast information of one of the second cells including an individual parameter that is individually used for judgment on cell selection to the second cell; a first broadcast information processor for reading the common parameter from the broadcast information of the first cell; a second broadcast information processor for reading the individual parameter from the broadcast information of the second cell; and a cell change controller for judging by the common and individual parameters whether the first cell can be changed to the second cell or not.

There are other aspects of the invention as described below. This disclosure of the invention therefore intends to provide part of the aspects of the invention and does not intend to limit the scope of the invention described and claimed herein.

BRIEF DESCRIPTION OF THE DRAWINGS

FIG. 2 shows a cell of a mobile phone network and cells of WLANs;

FIG. 3B shows an example of the cell selection information;

FIG. 3D shows an example of the conventional cell selection information;

FIG. 5 shows an example of a parameter determination process in the first embodiment;

FIG. 6A shows an example of pattern judgment dependent on the paging area registration;

FIG. 6B shows an example of pattern judgment dependent on the operator;

FIG. 6C shows an example of pattern judgment dependent on the MBMS;

FIG. 11C shows an outline of the cell selection information included in the broadcast information from the AP;

DETAILED DESCRIPTION OF THE INVENTION

Figure 1:
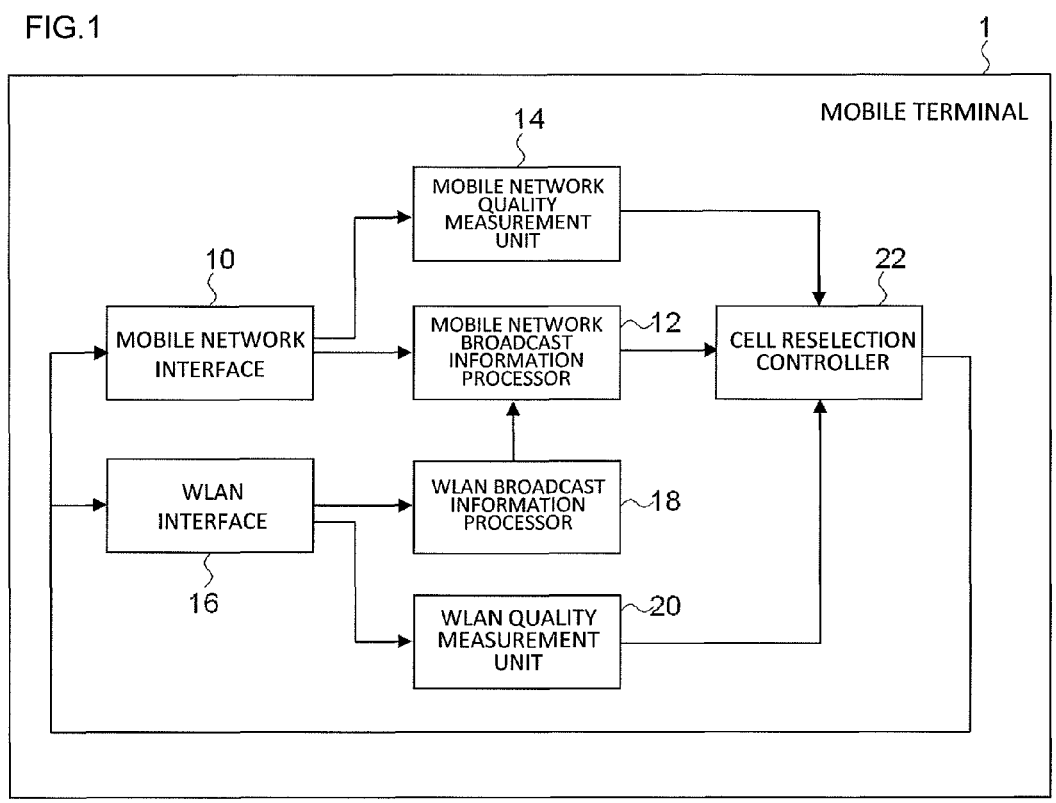
FIG. 1 shows a configuration of a mobile terminal used in a first embodiment.

The following is a detailed description of the invention. It will be understood that the embodiments described below are only examples of the invention, and the invention can be varied in various aspects. Therefore, the specific configurations and functions disclosed below do not limit the claims.

A cell selection system of an embodiment is for selecting a cell to be used for communications by a mobile terminal in a network having a first cell and a plurality of second cells which are included in the first cell and a communications protocol for which is different from that for the first cell, the mobile terminal supporting communications protocols for both the first and second cells, where broadcast information including cell selection information having cell change judgment parameters whose patterns are less than the number of the second cells is transmitted in the first cell, and where the mobile terminal receives the broadcast information of the first cell and broadcast information of one of the second cells; reads the cell selection information from the broadcast information of the first cell; determines, from the plurality of patterns of parameters included in the read cell selection information, a parameter to be used for judgment on cell selection to the second cell concerned based on the broadcast information of the second cell; and judges by the determined parameter whether the first cell can be changed to the second cell or not.

Since the patterned parameters are transmitted as the cell selection information as above, an increase in the second cells would not cause a corresponding increase in the cell selection information, and the amount of data in the broadcast information can be restricted. The broadcast information need not be updated also when a second cell is newly created, as existing parameters are used as parameters for judgment on cell selection to the second cell concerned. This can enhance the scalability of the system.

In the cell selection system of the embodiment, the cell selection information may include a common parameter that is commonly used for judgment on cell selection to all the second cells, and the mobile terminal may judge whether the first cell can be changed to the second cell or not based on the common parameter and the parameter determined based on the broadcast information of the second cell.

The above use of the common parameter can compress the amount of data in the cell selection information to be included in the broadcast information.

In the cell selection system of the embodiment, the mobile terminal may determine the parameter by information on whether a paging area registration is made with the second cell or not when in an idle mode, and may determine the parameter regardless of the presence or absence of a paging area registration with the second cell when establishing a communication connection.

In an idle mode, selecting a cell with which a paging area registration is made eliminates the need for making a paging area registration after the cell selection, and the power consumption of the mobile terminal can thus be saved. On the other hand, when establishing a communication connection, the mobile terminal connects to a base station that controls the first or second cell, and therefore whether a paging area registration is made or not does not matter in terms of power consumption, so that the presence or absence of a paging area registration need not be a criterion for the parameter determination. Consequently, a pattern for the cell change judgment can be appropriately determined by switching between using and not using the paging area registration information based on whether the mobile terminal is in an idle mode or is establishing a communication connection.

A cell selection system of another aspect of the embodiment is for selecting a cell to be used for communications by a mobile terminal in a network having a first cell and a plurality of second cells which are included in the first cell and a communications protocol for which is different from that for the first cell, the mobile terminal supporting communications protocols for both the first and second cells, where broadcast information including cell selection information comprising a common parameter that is commonly used for judgment on cell selection to all the second cells is transmitted in the first cell, where, in each of the second cells, broadcast information including an individual parameter that is individually used for judgment on cell selection to the second cell concerned is transmitted, and where the mobile terminal receives the broadcast information of the first cell and the broadcast information of one of the second cells; reads the common parameter from the broadcast information of the first cell; reads the individual parameter from the broadcast information of the second cell; and judges by the common and individual parameters whether the first cell can be changed to the second cell or not.

In this configuration, since the first cell need only transmit the common parameter as cell selection information, an increase in the second cells would not cause a corresponding increase in the cell selection information, and the amount of data in the broadcast information can be restricted. The broadcast information need not be updated also when a second cell is newly created. So, the scalability of the system can be enhanced.

In the cell selection system of the embodiment, the mobile terminal may select a cell using the cell selection information obtained from the broadcast information of the first cell if the reception quality of the broadcast information of the first cell is a predetermined threshold or higher, even after the mobile terminal selects the second cell.

In this configuration, even if the second cell does not have a sufficient cell reselection function, the cell selection can be performed just as it is done when the first cell is selected as a cell to be used for communications.

A cell selection method of the embodiment is for selecting a cell to be used for communications by a mobile terminal in a network having a first cell and a plurality of second cells which are included in the first cell and a communications protocol for which is different from that for the first cell, the mobile terminal supporting communications protocols for both the first and second cells, and the cell selection method comprises the steps of: transmitting, in the first cell, broadcast information including cell selection information having cell change judgment parameters whose patterns are less than the number of the second cells; transmitting broadcast information in the second cells; the mobile terminal receiving the broadcast information of the first cell and the broadcast information of one of the second cells; the mobile terminal reading the cell selection information from the broadcast information of the first cell; the mobile terminal determining, from the plurality of patterns of parameters included in the cell selection information, a parameter to be used for judgment on cell selection to the second cell concerned based on the broadcast information of the second cell; the mobile terminal judging by the determined parameter whether the first cell can be changed to the second cell or not; and selecting the first cell as the cell to be used for communications by the mobile terminal if the change is judged to be impossible in the change go/no-go judgment, and selecting the second cell as the cell to be used for communications by the mobile terminal if the change is judged to be possible.

A cell selection method of another aspect of the embodiment is for selecting a cell to be used for communications by a mobile terminal in a network having a first cell and a plurality of second cells which are included in the first cell and a communications protocol for which is different from that for the first cell, the mobile terminal supporting communications protocols for both the first and second cells, and the cell selection method comprises the steps of: transmitting, in the first cell, broadcast information including cell selection information comprising a common parameter that is commonly used for judgment on cell selection to all the second cells; transmitting, in each of the second cells, broadcast information including an individual parameter that is individually used for judgment on cell selection to the second cell concerned; the mobile terminal receiving the broadcast information of the first cell and the broadcast information of one of the second cells; the mobile terminal reading the common parameter from the broadcast information of the first cell; the mobile terminal reading the individual parameter from the broadcast information of the second cell; the mobile terminal judging by the common and individual parameters whether the first cell can be changed to the second cell or not; and selecting the first cell as the cell to be used for communications by the mobile terminal if the change is judged to be impossible in the change go/no-go judgment, and selecting the second cell as the cell to be used for communications by the mobile terminal if the change is judged to be possible.

In these configurations, as with the above-described cell selection system, the amount of data in the broadcast information can be restricted and the broadcast information need not be updated also when a second cell is newly created. The various configurations of the above-described cell selection system can be applied to the cell selection method of the embodiment.

A mobile terminal of the embodiment is used in a network having a first cell and a plurality of second cells which are included in the first cell and a communications protocol for which is different from that for the first cell, the mobile terminal supports communications protocols for both the first and second cells, and the mobile terminal comprises: a first broadcast information receiver for receiving broadcast information of the first cell including cell selection information having cell change judgment parameters whose patterns are less than the number of the second cells; a second broadcast information receiver for receiving broadcast information of one of the second cells; a broadcast information processor for reading the cell selection information from the broadcast information of the first cell and determining, from the plurality of patterns of parameters included in the read cell selection information, a parameter to be used for judgment on cell selection to the second cell concerned based on the broadcast information of the second cell; and a cell change controller for judging by the determined parameter whether the first cell can be changed to the second cell or not.

A mobile terminal of another aspect of the embodiment is used in a network having a first cell and a plurality of second cells which are included in the first cell and a communications protocol for which is different from that for the first cell, the mobile terminal supports communications protocols for both the first and second cells, and the mobile terminal comprises: a first broadcast information receiver for receiving broadcast information of the first cell including cell selection information comprising a common parameter that is commonly used for judgment on cell selection to all the second cells; a second broadcast information receiver for receiving broadcast information of one of the second cells including an individual parameter that is individually used for judgment on cell selection to the second cell; a first broadcast information processor for reading the common parameter from the broadcast information of the first cell; a second broadcast information processor for reading the individual parameter from the broadcast information of the second cell; and a cell change controller for judging by the common and individual parameters whether the first cell can be changed to the second cell or not.

In these configurations, as with the above-described cell selection system, the amount of data in the broadcast information can be restricted and the broadcast information need not be updated also when a second cell is newly created. The various configurations of the above-described cell selection system can be applied to the mobile terminal of the embodiment.

Now, cell selection systems of embodiments of the invention will be described with reference to the drawings. In the following description of the embodiments, a system for a mobile phone, such as GPRS, UMTS, and LTE, is described as a mobile phone network, and a system that may be used as a kind of hot spot (including WiMAX) is described as a WLAN.

First Embodiment

FIG. 1 shows a configuration of a mobile terminal 1 used in a cell selection system of a first embodiment, and FIG. 2 shows a mobile phone network cell (first cell) 32 and WLAN cells (second cells) 42a to 42c. In the following description, the cells 42a to 42c are collectively called the cell 42 when required. First, the general configuration of the cell selection system of the embodiment and broadcast information transmitted in each of the cells 32 and 42 will be described with reference to FIG. 2.

As shown in FIG. 2, the mobile phone network cell 32 in the cell selection system of the embodiment includes the plurality of WLAN cells 42a to 42c. The plurality of WLAN cells 42a to 42c may each have a different communications protocol.

Suppose that the mobile terminal 1 enters the WLAN cell 42a as shown in FIG. 2. In this state, the mobile terminal 1 can communicate with a base station 30 of the mobile phone network, and with the AP 40a of the WLAN as well. The mobile terminal 1 selects whether it carries out communications through the mobile phone network cell 32 or through the WLAN cell 42a after changing the cell thereto.

The base station 30 of the mobile phone network transmits broadcast information to the mobile terminal 1 in the cell 32. This broadcast information includes cell selection information for selecting a cell. Each of the APs 40a to 40c of the WLANs transmits broadcast information (beacon). In the following description, the APs 40a to 40c are collectively called the AP 40 when required. The broadcast information transmitted by the AP 40 includes information on the AP 40. For example, the broadcast information transmitted by the AP 40a includes information on the AP 40a, and the broadcast information transmitted by the AP 40b includes information on the AP 40b.

The information on the AP 40 is, for example, paging area information, PLMN information, MBMS information, or the like. Paging area information shows which paging area an AP belongs to, and is e.g. an identifier indicating the paging area. The mobile terminal 1 stores an identifier of a paging area that it has registered with. The mobile terminal 1 compares a paging area identifier of an AP sent in the broadcast information (beacon) with the stored paging area identifier, thereby judging whether the AP is registered as its paging area or not. A paging area is a "routing area, location area" in UMTS or a "tracking area" in LTE, and means an area in which the mobile terminal 1 can receive a paging signal.

Figure 3A:
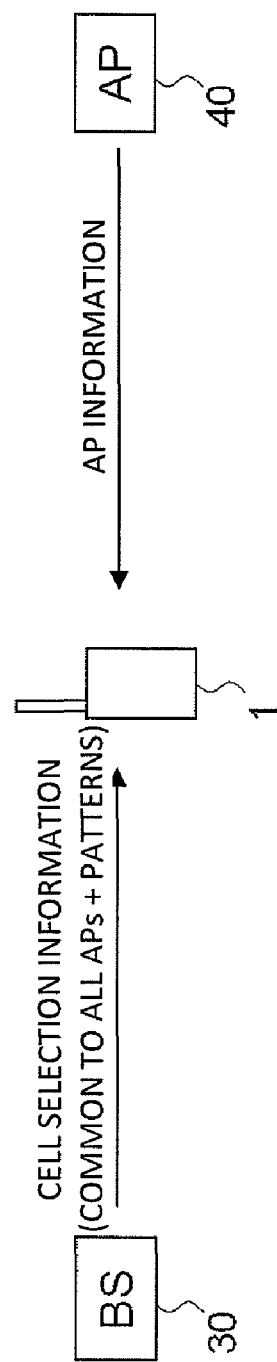
FIG. 3A shows an outline of cell selection information included in broadcast information transmitted from a base station.

FIG. 3A shows an outline of the cell selection information included in the broadcast information transmitted by the base station 30, and FIG. 3B shows an example of the cell selection information. In the cell selection system of the embodiment, the base station 30 transmits, as the cell selection information, parameters that are common to all the APs 40a to 40c and parameters that are patterned into a plurality of patterns. Specifically, as shown in FIG. 3B, the cell selection information includes parameters "Ssearch," "Qrxlevmin," "Qhyst," and "Treselection" that are commonly used for judgment about the change to the APs 40a to 40c, and parameters "Offset" and "Scaling factor" that each have values of two patterns.

"Offset" is a parameter to set the ease of changing a target to the AP 40. For example, greater "Offset" makes it harder to change a target to the AP 40. "Scaling factor" is a parameter to change the value of "Treselection," as described before. Greater "Scaling factor" makes it harder to change a target to the AP 40. In this example, parameters of Pattern 1 make it easier to change the cell 32 to the cell 42 than parameters of Pattern 2.

A configuration of the mobile terminal 1 will be described with reference to FIG. 1. The mobile terminal 1 has a mobile network interface 10 (which corresponds to the "first broadcast information receiver" of the claims) for communicating through a mobile phone network, and a WLAN interface 16 (which corresponds to the "second broadcast information receiver" of the claims) for communicating through a WLAN. That is, the mobile terminal 1 supports protocols for both the mobile phone network and the WLAN. The mobile network interface 10 and the WLAN interface 16 also have a function of demodulating a received signal.

The mobile terminal 1 has a WLAN broadcast information processor 18 and a WLAN quality measurement unit 20 which are connected with the WLAN interface 16. Upon receiving broadcast information from the AP 40 through the WLAN, the WLAN interface 16 sends the received broadcast information to the WLAN broadcast information processor 18. Upon receiving from the AP 40 a reference signal for monitoring the radio reception quality, the WLAN interface 16 sends the received reference signal to the WLAN quality measurement unit 20.

The WLAN broadcast information processor 18 processes the broadcast information transmitted from the AP 40 to acquire information on the AP 40, and sends the acquired information on the AP 40 to a mobile network broadcast information processor 12. The WLAN quality measurement unit 20 measures the radio reception quality of the cell 42 of the WLAN, and sends the reception quality measurement result to a cell reselection controller 22.

The mobile terminal 1 has the mobile network broadcast information processor 12 and a mobile network quality measurement unit 14 which are connected with the mobile network interface 10. Upon receiving broadcast information from the base station 30 through the mobile phone network, the mobile network interface 10 sends the received broadcast information to the mobile network broadcast information processor 12. Upon receiving from the base station 30 a reference signal for monitoring the radio reception quality, the mobile network interface 10 sends the received reference signal to the mobile network quality measurement unit 14.

The mobile network broadcast information processor 12 (which corresponds to the "broadcast information processor" of the claims) processes the broadcast information transmitted from the base station 30 to acquire cell selection information (see FIG. 3B). Based on the information on the AP 40 sent from the WLAN broadcast information processor 18, the mobile network broadcast information processor 12 determines which of the parameters of Patterns 1 and 2 included in the cell selection information are to be used to perform cell change judgment. The mobile network broadcast information processor 12 uses, for example, paging area information, PLMN information, MBMS information, or the like, as the information on the AP 40. The mobile network broadcast information processor 12 sends the determined parameters and the common parameters to the cell reselection controller 22 (which corresponds to the "cell change controller" of the claims).

The mobile network quality measurement unit 14 measures the radio reception quality of the cell 32 of the mobile phone network, and sends the reception quality measurement result to the cell reselection controller 22. The cell reselection controller 22 has a function of selecting a cell using parameters sent from the mobile network broadcast information processor 12 to evaluate the radio reception quality of the cell 32 of the mobile phone network and the cell 42 of the WLAN.

An operation of the mobile terminal 1 of the embodiment will next be described.

Figure 4:
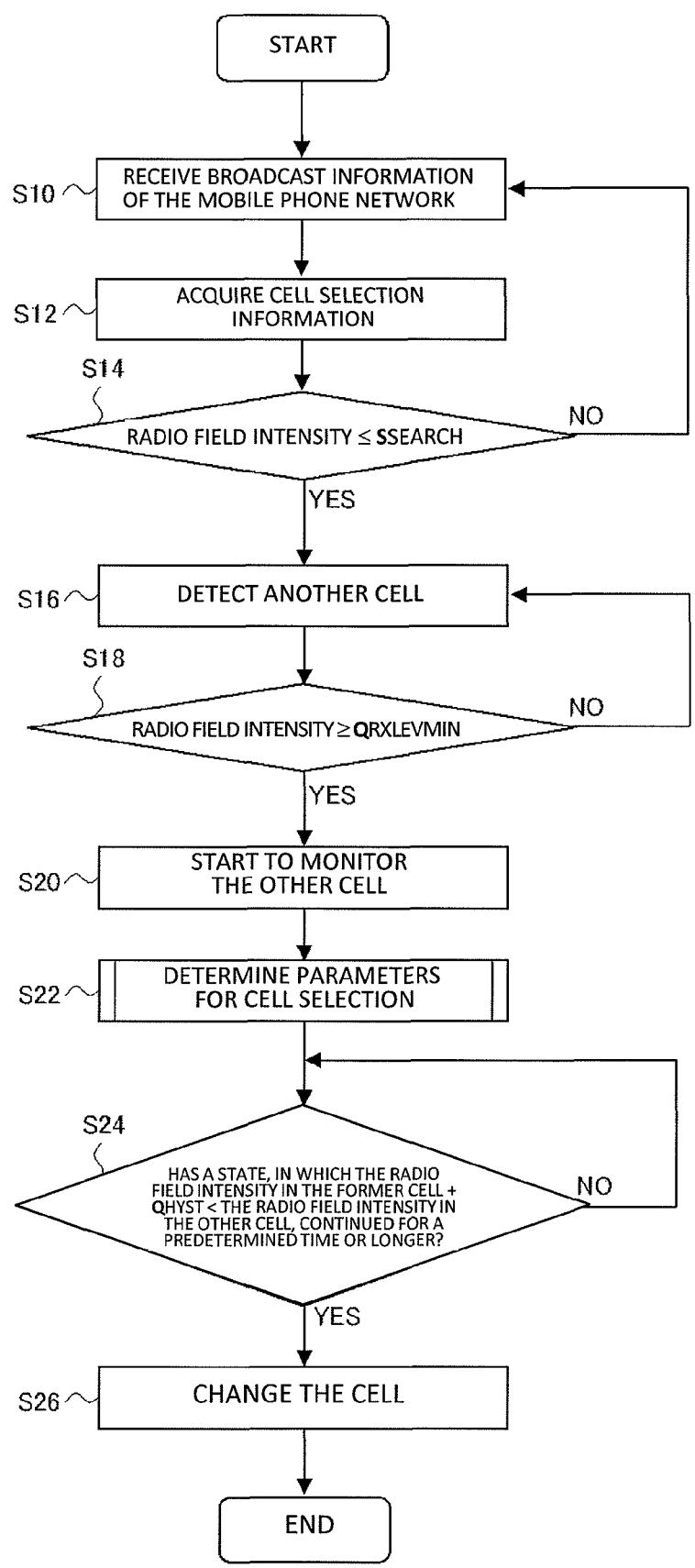
FIG. 4 shows an operation of the mobile terminal of the first embodiment.

FIG. 4 shows an operation of the mobile terminal 1. An example is shown in FIG. 4 where when the mobile terminal 1 moves into a cell 42 of a WLAN, the cell to be used for communications by the mobile terminal 1 is changed from the cell 32 of the mobile phone network to the cell 42 of the WLAN.

The mobile terminal 1 receives broadcast information of the mobile phone network from the base station 30 (S10). The broadcast information may be received with any timing, such as periodically or when the mobile terminal 1 changes the cell. When the mobile terminal 1 changes the cell, the change in the broadcast information is notified of by paging or the like.

The mobile terminal 1 receives the broadcast information by means of the mobile network interface 10, and processes the received broadcast information by means of the mobile network broadcast information processor 12. The broadcast information includes MIB (Master Information Block), SIB 1, SIB 2, . . . , and the like. The cell selection information may be included in one SIB or across a plurality of SIBs (including MIB). The mobile network broadcast information processor 12 acquires the cell selection information from MIB, SIB 1, SIB 2, . . . , or the like (S12).

The mobile terminal 1 determines whether a cell 42 of a WLAN is to be detected and monitored or not based on the radio reception quality of the cell 32 of the mobile phone network. Specifically, the mobile terminal 1 judges whether the radio field intensity in the cell 32 of the mobile phone network is equal to or lower than the parameter "Ssearch" or not (S14). If the radio field intensity in the cell 32 of the mobile phone network is higher than the parameter "Ssearch" (No at S14), the cell 32 of the mobile phone network may be used for communications, and therefore the detection and monitoring of a cell 42 of another network are not performed. The above use of the parameter "Ssearch" to judge whether another cell is to be detected and monitored or not can reduce the power consumption of the mobile terminal 1.

If the radio field intensity in the cell 32 of the mobile phone network is equal to or lower than the parameter "Ssearch" (Yes at S14), the mobile terminal 1 performs detection of another cell 42 (S16). The mobile terminal 1 may then specify which frequency band is to be searched, what kind of cell is to be detected, or the like to detect a cell.

Upon detection of another cell 42, the mobile terminal 1 judges whether the radio field intensity in the cell 42 is equal to or higher than the parameter "Qrxlevmin" or not (S18). If the radio field intensity is lower than the parameter "Qrxlevmin" (No at S18), the mobile terminal 1 judges that the cell 42 is not a candidate change destination, and returns again to the process of detecting another cell 42 (S16).

If the radio field intensity in the other cell 42 is equal to or higher than the parameter "Qrxlevmin" (Yes at S18), the mobile terminal 1 starts to monitor the other cell 42 (S20). The operation of detection and monitoring of another cell 42 here depends on the implementation of the terminal, and it is thought that 3GPP specifications or the like will specify what kind of performance requirements should be satisfied or the like.

Upon detection of the other cell 42, the mobile terminal 1 receives broadcast information (beacon) transmitted by the AP 40 of the other cell 42. The mobile terminal 1 receives the broadcast information by means of the WLAN interface 16, and processes the received broadcast information by means of the WLAN broadcast information processor 18 to acquire information on the AP 40. Examples of the information on the AP 40 include paging area information, PLMN information, and MBMS information. The WLAN broadcast information processor 18 passes the information on the AP 40 acquired from the broadcast information to the mobile network broadcast information processor 12.

Based on the information on the AP 40, the mobile network broadcast information processor 12 of the mobile terminal 1 then determines which of the parameters of Patterns 1 and 2 are to be used as parameters to judge the change to the detected cell.

FIG. 5 shows an operation of the parameter determination process. In the embodiment, the mobile terminal 1 determines which of the parameters of Patterns 1 and 2 are to be used, by paging area information, PLMN information, and MBMS information acquired from the information on the AP 40.

First, the mobile terminal 1 judges whether a paging area registration has been made with the other cell 42 or not based on the paging area information (S30). If the result indicates that the paging area registration has not been made (No at S30), the mobile terminal 1 uses parameters of Pattern 2 (S40). If the paging area registration has been made (Yes at S30), the mobile terminal 1 judges whether the operator of the AP 40 of the other cell 42 is the same as the operator of the base station 30 of the mobile phone network or not (S32). If the result indicates that the operators are different from each other (No at S32), the mobile terminal 1 uses parameters of Pattern 2 (S40). If the operators are the same (Yes at S32), the mobile terminal 1 judges whether an MBMS that the user desires to receive exists in the other cell 42 or not (S34).

If the MBMS exists (Yes at S34), the mobile terminal 1 uses parameters of Pattern 1 (S38). If the MBMS desired to be received does not exist (No at S34), the mobile terminal 1 judges whether the time to start the MBMS is within a predetermined time T or not (S36). Information called "time-to-MBMS," which is defined on the network side and indicates when the MBMS starts, is used as to the time to start the MBMS. The AP 40 notifying the mobile terminal 1 of this information allows the mobile terminal 1 to know when the service starts. If the result of the judgment about the time to start the MBMS indicates that the time to start the MBMS is within the predetermined time T (Yes at S36), the mobile terminal 1 judges that the change to the other cell 42 is impossible (S42). If the time to start the MBMS is not within the predetermined time T (No at S36), the mobile terminal 1 uses parameters of Pattern 2 (S40).

While there has been described a method of determining the pattern of parameters to be used for the cell change judgment, the parameter determination method described with reference to FIG. 5 is just an example, and another method may determine the parameters. In the above-described example, Pattern 1 is selected only if: the paging area registration has been made; the operators are the same; and the MBMS is provided. Conversely, parameters of Pattern 1 may be selected if any one of the conditions is satisfied (i.e. if judged Yes in any one of the steps S30, S32, and S34). Alternatively, for example, parameter determination criterion tables may be stored for each of the paging area registration, operator, and MBMS as shown in FIGS. 6A to 6C to determine the pattern of the parameters based on a majority decision among patterns chosen according to each table.

The pattern determination method based on the information on the AP 40 may be transmitted to the mobile terminal 1 as broadcast information, may be predetermined by 3GPP specifications, may be implemented in advance on the mobile terminal 1 with specifications determined by an operator, or may be notified of in advance to the mobile terminal with an individual message. Three criteria, namely the paging area registration, operator, and MBMS, are used in the embodiment, but alternatively the pattern may be determined by other criteria.

Returning to FIG. 4, the description of the operation of the mobile terminal 1 will be continued. The mobile terminal 1 judges whether a state, in which the value of the radio field intensity in the cell 32 of the mobile phone network added with the parameter "Qhyst" is lower than the radio field intensity in the other cell 42, has continued for a predetermined time or not (S24). The predetermined time here is determined to be the parameter "Treselection" multiplied by the parameter "Scaling factor" of the determined pattern. As a result, the ease of cell change varies depending on which of the parameters of Patterns 1 and 2 have been chosen.

If it is judged that the state, in which the value of the radio field intensity in the cell 32 of the mobile phone network added with the parameter "Qhyst" is lower than the radio field intensity in the cell 42 of the WLAN, has continued for the predetermined time or longer (Yes at S24), the mobile terminal 1 changes the cell 32 of the mobile phone network to the cell 42 of the WLAN. Specifically, the mobile terminal 1 registers with the cell 42 of the WLAN so as to be able to receive an incoming call via the WLAN.

In the cell selection system of the embodiment, since the base station 30 of the mobile phone network transmits patterned parameters as the cell selection information, an increase in the number of cells 42 of WLANs included in the cell 32 of the mobile phone network would not cause an increase in the number of patterned parameters, so that the amount of data in the broadcast information can be restricted.

Figure 3C:
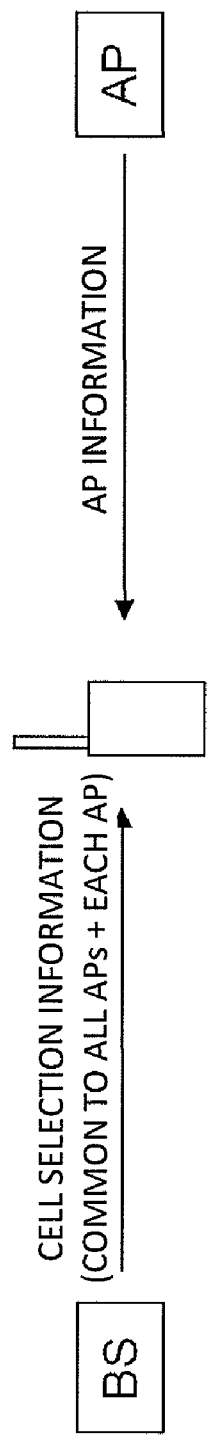
FIG. 3C shows an outline of cell selection information included in conventional broadcast information.

FIGS. 3C and 3D show an example of cell selection information in a conventional system. In a conventional cell selection system, a base station would transmit parameters common to all the APs and individual parameters for each AP as cell selection information. Specifically, as shown in FIG. 3D, the cell selection information would include common parameters "Ssearch," "Qrxlevmin," "Qhyst," and "Treselection," as well as "Offset" and "Scaling factor" the numbers of which are the same as the number of the APs. As a result, the amount of data in the broadcast information would increase with an increase in the number of the APs. On the other hand, the cell selection system of the embodiment can prevent such inconvenience.

The configuration of the cell selection information shown in FIG. 3B is just an example. Information that is not included in FIG. 3 may be included as the cell selection information, or information shown in FIG. 3 need not be included.

In the embodiment, "Offset" is used as a parameter to set the ease of changing a target to the AP 40. Referring to the example in FIG. 2, the intensity of a signal from the base station 30 is compared with that from the AP 40a, with "Offset" taken into consideration. That is, if the signal intensity of the base station<the signal intensity of an AP+"Offset," then the AP is selected. However, absolute priorities can also be used to make the comparison. Specifically, not "Offset" but priorities (Priority) can be transmitted instead of "Offset." Suppose, for example, that Pattern 1 in FIG. 3B is "Priority 1" and Pattern 2 is "Priority 3" when "Priority" of the base station 30, to which the terminal currently belongs, is 2. In this case, if the terminal chooses Pattern 1 for the AP 40a, the terminal selects the cell of the AP 40a since its priority is higher than that of the current base station 30. On the contrary, if the terminal chooses Pattern 2 for the AP 40a, the terminal continues to belong to the base station 30 since the priority is lower than that of the current base station 30. It is also conceivable that "Offset" is used to compare those whose "Priorities" are the same even in a case where "Priority" is used. For this purpose, "Priority" and "Offset" can both be transmitted.

The mobile terminal 1 may also be individually assigned with "Offset" or "Priority," or both of them, separately from broadcast information. This is to change the operation according to the characteristics or contract of each mobile terminal 1 in such a way that, for example, the mobile terminal 1 only supporting voice communications preferentially uses UMTS or GSM operated in a GPRS network, or the mobile terminal 1 only supporting data communications preferentially uses an Evolved network. These operations can be set by transmitting a message to the mobile terminal 1 when the mobile terminal 1 is connected to the network, or may be set in advance in the mobile terminal 1. In such cases, by using information given as broadcast information, "Offset" or "Priority," or both of them set in the mobile terminal 1 are modified according to the broadcast information. For this purpose, information on how to modify "Offset" or "Priority," or both of them stored in the mobile terminal 1 may be transmitted as the broadcast information. However, since "Offset" or "Priority," or both of them may not be assigned individually, broadcast information may be commonly transmitted and the mobile terminal 1 individually receiving "Offset" or "Priority," or both of them may determine the value taking both the broadcast information and the information that it has received into account. The determination methods include setting the value to the higher, setting the value to the lower, setting the value to the middle, and laying down a special rule, and may be any one of them.

In the embodiment, since parameters of known patterns are used for change judgment also on an AP 40 to be newly installed and there is thus no need to update in order to include new parameters in the broadcast information, it is easy to operate the base station 30.

In the embodiment, a cell 42 with which a paging area registration has been made is made easy to select, and a cell 42 with which a paging area registration has not been made is made difficult to select. This is because, for an AP 40 with which a paging area registration has been made, the mobile terminal 1 only selects the cell and need not make another paging area registration, whereas when a paging area registration has not been made, the mobile terminal 1 is required to make a location registration (Routing Area Update, Tracking Area Update, Binding Update, etc.) with the AP40 concerned, which increases the power consumption of the mobile terminal 1. The cell selection controlled by the mobile terminal 1 according to the presence or absence of a paging area registration can reduce the power consumption of the mobile terminal 1.

In a system in which a paging area in a WLAN is updated at the same time as the update of a paging area in the mobile phone network, the comparison is made not by using the previously registered paging area but by using the updated paging area.

While in the embodiment there has been described an example where the pattern of the parameters is determined according to the presence or absence of a paging area registration, the parameters can be determined based on whether an IP address has been acquired or not, instead of on the presence or absence of a paging area registration. For example, there is a case where an IP address acquisition in a WLAN is made on a router by router basis, the routers being at a higher level than the APs. In this case, the pattern may be determined depending on whether the acquisition and registration of a different IP address are required or not. That is, the pattern is changed depending on whether an information exchange is newly required when a terminal goes on standby in an AP or not.

In the embodiment, there has been described an example where the pattern of parameters used by the mobile terminal 1 is determined according to PLMN information included in broadcast information from the AP 40. This process is particularly effective when the network is shared (sharing of a radio access part (base station in LTE) between operators).

Figure 7:
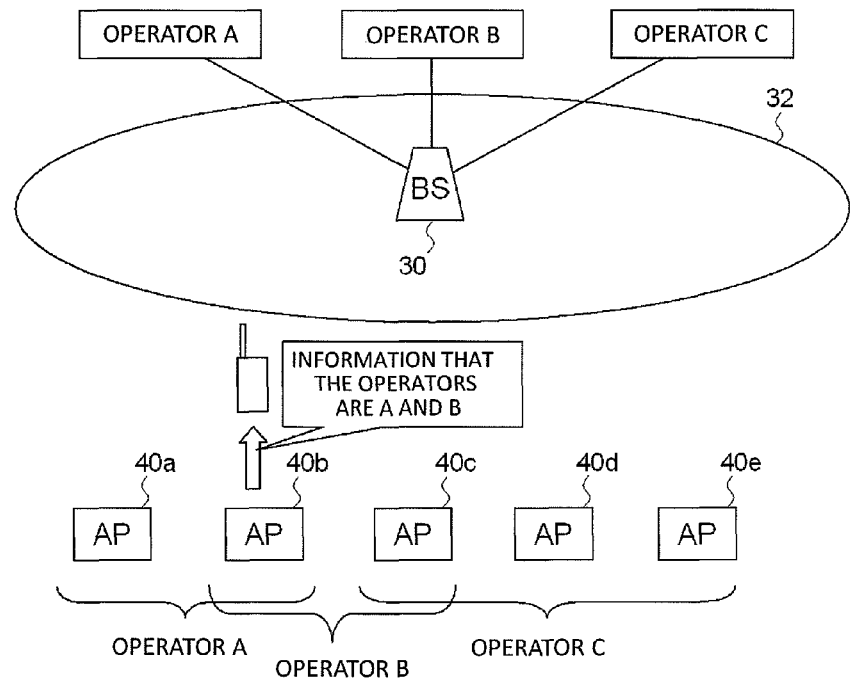
FIG. 7 shows an example of network sharing.

FIG. 7 is a conceptual diagram of the network sharing. Here, Operators A to C share the base station 30 of the mobile phone network. Since the contents of broadcast information are to be common to Operators A to C, information on all Operators A to C will be released. For this reason, even if Operators A and C are operating the AP 40 with information at different frequency bands for example, those frequency bands will all be transmitted as the broadcast information. For example, if a terminal belonging to Operator C is within the coverage of the AP 40b belonging to Operator A, the terminal will detect the AP 40b. At this time, the mobile terminal 1 sees the PLMN information to determine the pattern of parameters that it actually uses, and can thereby carry out an effective cell reselection.

In the embodiment, there has been described an example where whether an operator of a WLAN is the same as that of the mobile phone network or not is judged and parameters of Pattern 2 are used if the operators are different from each other. If the PLMN of the WLAN is included in an equivalent PLMN (PLMN that may be handled in the same way as a home PLMN defined in 3GPP), however, parameters of Pattern 1 may be used even if the operators are different.

In the embodiment, there has been described an example where the parameters are determined by MBMS information. If an MBMS is provided by both the mobile phone network and a WLAN, however, the parameters can be determined according to the presence or absence of an uplink signal. There are MBMSs of a type that uses an uplink signal and MBMSs of a type that does not use an uplink signal, and an MBMS of the type that uses an uplink signal correspondingly requires the mobile terminal 1 to use electricity. For this reason, the mobile terminal 1 may determine the parameters so that a cell that does not use an uplink signal is easily selected.

MBMSs involve: single-cell transmission for transmitting data only to a cell concerned; and MBSFN transmission for transmitting data simultaneously to a plurality of cells and thereby providing a combined gain for the mobile terminal 1. MBSFN transmission generally provides higher performance, and therefore if an MBMS is provided by both the mobile phone network and a WLAN, the parameters may be determined so that a cell using an MBSFN is easily selected.

Second Embodiment

A cell selection system of a second embodiment of the invention will next be described. The basic configuration of the cell selection system of the second embodiment is the same as that of the cell selection system of the first embodiment. While the first embodiment is based on the assumption that the mobile terminal is in an idle mode, in the second embodiment the parameters are determined when a communication connection is established, in a manner different from that of the first embodiment.

Figure 8:
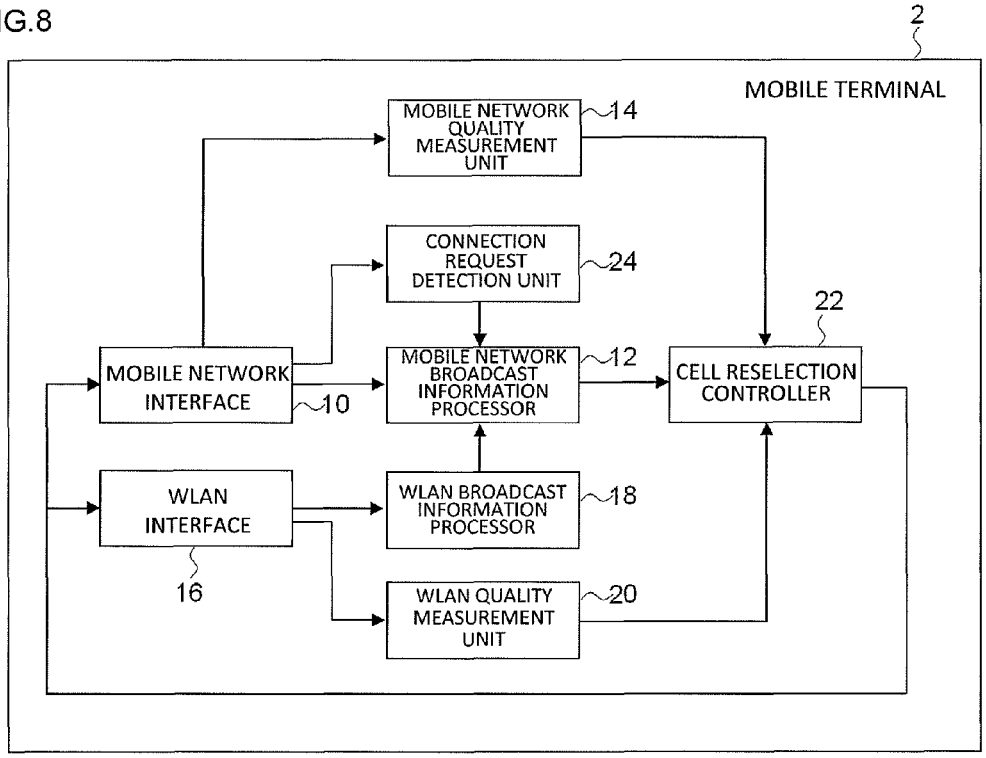
FIG. 8 shows a configuration of a mobile terminal used in a second embodiment.

FIG. 8 shows a configuration of a mobile terminal 2 used in the cell selection system of the second embodiment of the invention. The mobile terminal 2 of the second embodiment has a connection request detection unit 24 in addition to the configuration of the mobile terminal 1 of the first embodiment.

The connection request detection unit 24 detects whether the mobile terminal 2 is required to make a connection request or not and, if it detects that, transmits information on the detection to the mobile network broadcast information processor 12. Cases where the mobile terminal 2 is required to make a connection request include a case where the mobile terminal 2 receives a paging signal and a case where the mobile terminal 2 generates a call. When the mobile terminal 2 receives a paging signal, the connection request detection unit 24 receives the paging signal from the mobile network interface 10 to detect a connection request. When a call is generated in the mobile terminal 2, the connection request detection unit 24 detects the generation of the call.

Figure 9:
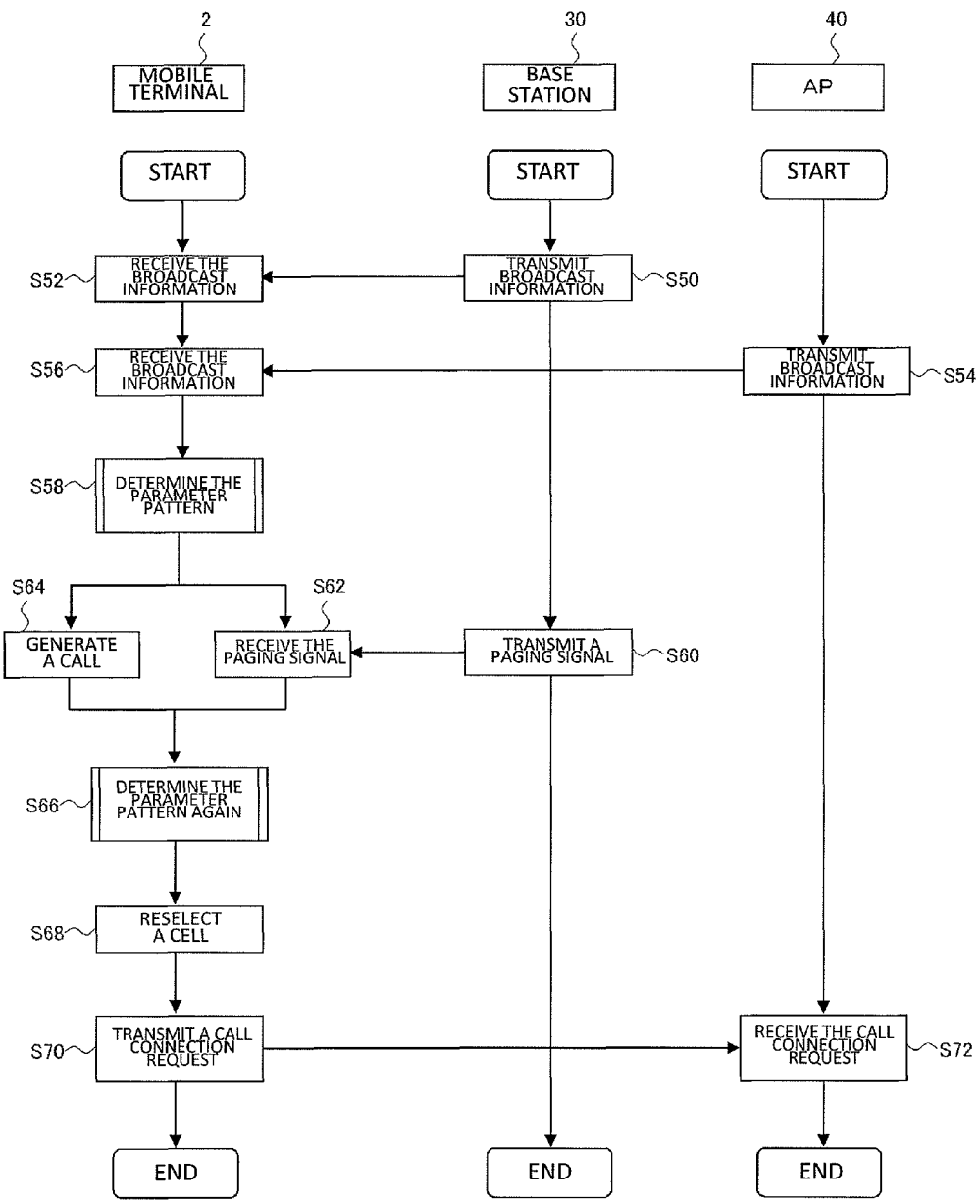
FIG. 9 shows a flow to perform a cell selection in the second embodiment.

FIG. 9 shows a flow of cell selection in the cell selection system of the second embodiment. In the cell selection system of the second embodiment, broadcast information is transmitted from the base station 30 to the mobile terminal 2 (S50 and S52), and broadcast information is transmitted from an AP 40 to the mobile terminal 2 (S54 and S56), as in the case of the first embodiment. The mobile terminal 2 determines parameters to be used for cell change judgment, as in the case of the first embodiment (S58).

Then, if a paging signal is transmitted from the base station 30 to the mobile terminal 2 (S60 and S62) or a call is generated in the mobile terminal 2 (S64), the mobile terminal 2 again determines the parameters to be used for cell change judgment and uses the determined parameters to select the cell, before establishing a communication connection. While there has been described the case where a paging signal is transmitted from the base station 30 to the mobile terminal 2 in FIG. 9, the same holds for a case where a paging signal is transmitted from the AP 40 of a WLAN.

Figure 10:
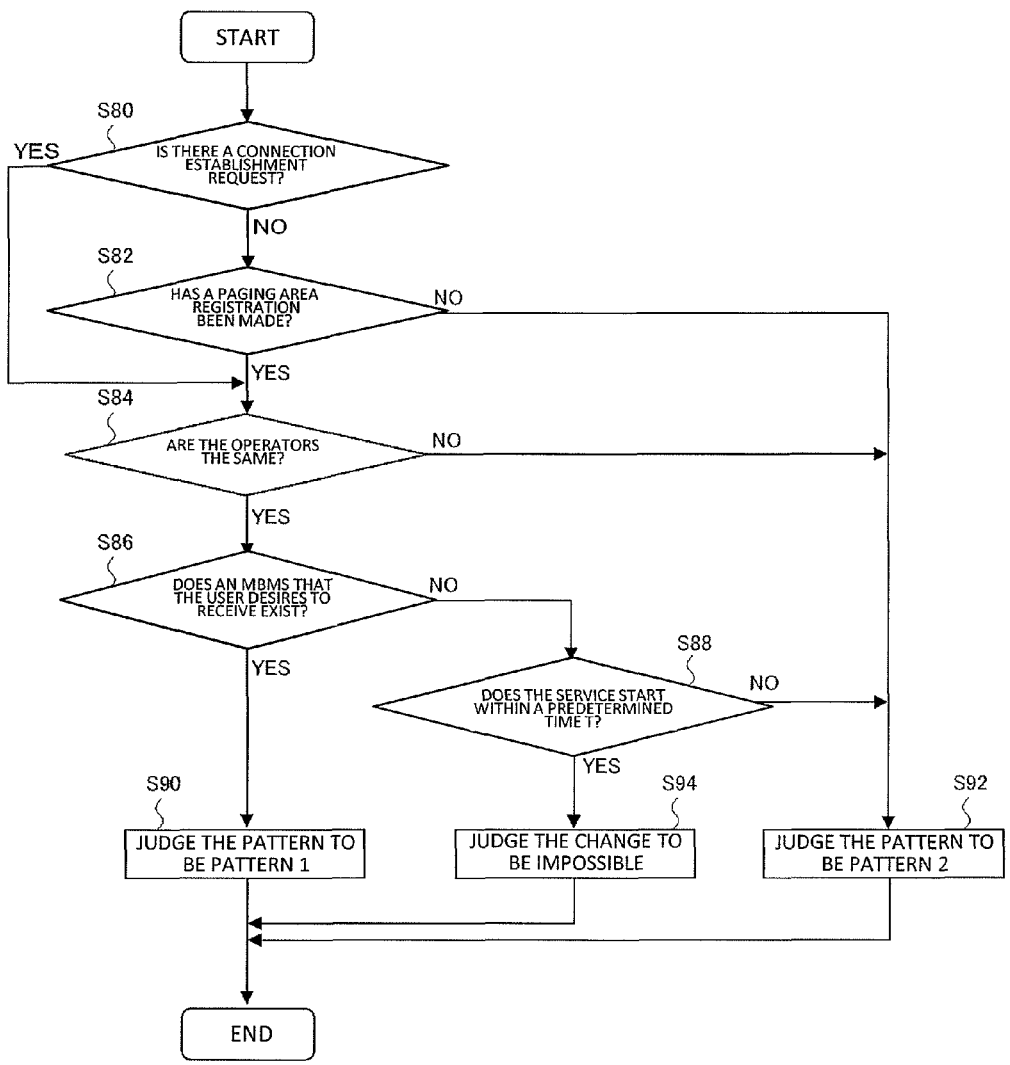
FIG. 10 shows an example of a parameter determination process in the second embodiment.

FIG. 10 is a flowchart showing the process of determining the parameters to be used for cell change judgment by the mobile network broadcast information processor 12. The mobile network broadcast information processor 12 first judges whether there is a connection establishment request or not (S80). If there is no connection establishment request (No at S80), the mobile terminal 2 judges whether a paging area registration has been made or not (S82) and then judges the pattern according to the operators and to the presence or absence of an MBMS (S84 to S94), as with the operation of the mobile terminal 1 described in the first embodiment. If there is a connection establishment request (Yes at S80), the mobile network broadcast information processor 12 skips the judgment on whether a paging registration has been made or not and goes to the judgment on the operators (S84).

Returning to FIG. 9, the operation of the cell selection system will be described. After determining the parameters to be used for cell change judgment (S66), the mobile terminal 2 uses the determined parameters to carry out cell reselection (S68). The mobile terminal 2 transmits a call connection request to the selected cell (S70 and S72). In the example shown in FIG. 9, the mobile terminal 2 selects the cell 42 of the WLAN and transmits a call connection request to the AP 40 of the WLAN.

Since the cell selection system of the embodiment selects a cell according to the criterion different from that for an idle mode when there is a communication connection establishment request, the system can select a cell that is suitable for the situation where a communication connection is initiated. When a connection establishment request initiates communications, there is no difference in power consumption between connecting to a network with which a paging area registration has been made and connecting to a network with which a paging area registration has not been made, and therefore a paging area registration need not be used as a criterion for the cell selection. For this reason, when communications are to be initiated, the mobile terminal 2 reselects a cell through the process shown in FIG. 10.

In the embodiment, the example where the judgment about the presence or absence of a paging area registration is skipped has been given as an example of selecting a cell by a criterion different from that for an idle mode when there is a connection establishment request. However, the way of changing the parameter determination method from that for an idle mode when there is a connection establishment request is not limited to the above-described scheme using the presence or absence of a paging area registration. For example, an MBMS generally requires no uplink signal but occasionally uses an uplink signal. An example of this case is that the radio qualities of mobile terminals are reported to a base station or AP and an MBMS is provided so as to be adapted to a mobile terminal whose radio quality is the worst. An uplink signal is also required to carry out an operation in which mobile terminals inform a base station or AP of having been unable to receive and the base station or AP performs a retransmission if many mobile terminals have been unable to receive. So, in a network that provides an MBMS, the parameters may be determined in an idle mode in such a way that a cell requiring an uplink signal for the MBMS is made difficult to select, and may be determined in such a way that a cell is selected regardless of the presence or absence of an uplink signal, when there is a connection establishment request.

Third Embodiment

A cell selection system of a third embodiment of the invention will next be described. In the first and second embodiments, examples have been described in which some functions are added to the base station 30 of the mobile phone network and the mobile terminals 1 and 2 in order to reduce the amount of data in broadcast information of the mobile phone network, whereas a function is also added to the APs 40 of WLANs in the cell selection system of the third embodiment.

Figures 11A, 11B:
FIG. 11A shows an outline of cell selection information included in broadcast information transmitted from a base station and an AP.
FIG. 11B shows an example of the cell selection information included in the broadcast information from the base station.

FIG. 11A shows an outline of cell selection information included in broadcast information transmitted from the base station 30 and an AP 40 in the third embodiment, FIG. 11B shows an example of the cell selection information included in the broadcast information from the base station 30, and FIG. 11C shows an example of the cell selection information included in the broadcast information from the AP 40.

As shown in FIGS. 11A and 11B, the base station 30 of the mobile phone network transmits parameters to be commonly used for judgment on cell selection to all the APs 40. In this example, the base station 30 transmits parameters "Ssearch," "Qrxlevmin," "Qhyst," and "Treselection."

As shown in FIGS. 11A and 11C, the AP 40 of a WLAN transmits parameters to be individually used for judgment on cell selection to the AP 40 concerned. In this example, the AP 40 transmits parameters "Offset" and "Scaling factor."

A mobile terminal of the third embodiment has basically the same configuration as the mobile terminal 1 of the first embodiment (see FIG. 1). In the third embodiment, however, the mobile network broadcast information processor 12 does not determine parameters to be used for change judgment from a plurality of patterns of parameters included in broadcast information, but uses common parameters read from the broadcast information received from the base station 30 and the AP's individual parameters read from the broadcast information received from the AP 40 to configure parameters to be used for cell change judgment.

In the cell selection system of the third embodiment, since the base station 30 of the mobile phone network transmits only parameters common to all the APs 40 as cell selection information, the amount of data in the broadcast information can be restricted regardless of the number of cells 42 of other networks included in the cell 32 of the mobile phone network.

It is conceivable that, when an AP 40 transmits cell selection information as broadcast information (beacon) for the sake of a mobile terminal that has selected the AP 40, part or all of the information described in FIG. 11C is included in the broadcast information. In this case, the mobile terminal can reuse the broadcast information. In the example in FIG. 11C for example, if the AP 40 transmits "Offset" as cell selection information for the sake of a mobile terminal that has selected the AP 40, information required to be newly transmitted as AP information is only "Scaling factor."

Fourth Embodiment

A cell selection system of a fourth embodiment of the invention will next be described. In the cell selection system of the fourth embodiment, a mobile terminal performs a cell reselection process using cell selection information included in broadcast information transmitted from the base station 30 of the mobile phone network if the radio field intensity of the broadcast information transmitted from the base station 30 is a predetermined threshold or higher, even after the mobile terminal selects a cell 42 of a WLAN.

Figure 12:
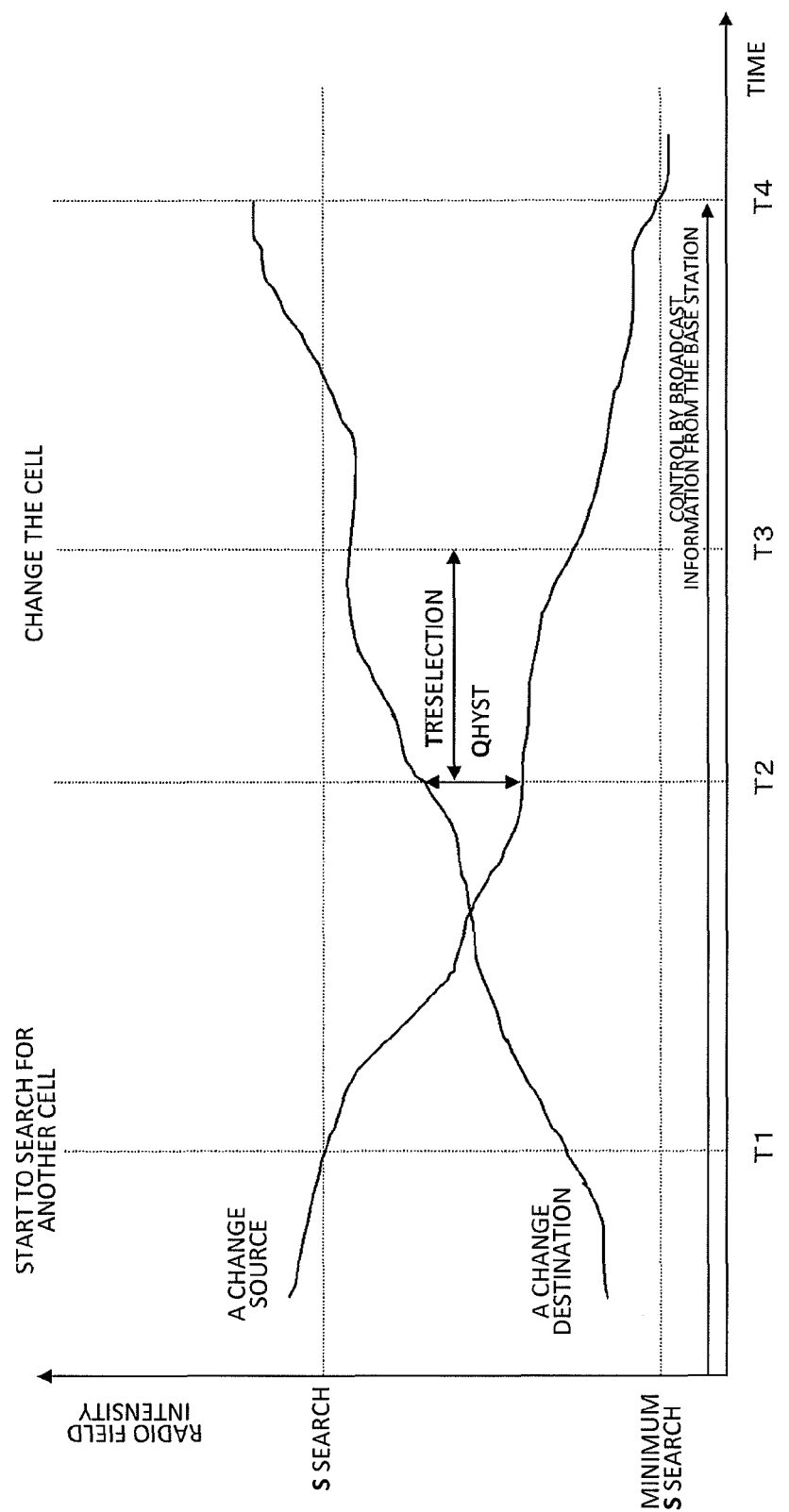
FIG. 12 illustrates an operation of a cell selection system of a fourth embodiment.

FIG. 12 illustrates an operation of the cell selection system of the fourth embodiment. As shown in FIG. 12, a mobile terminal 4 defines a new parameter "MinimumSsearch," and uses this parameter to control cell selection. If the radio field intensity in the cell 32 of the mobile phone network is higher than the value of the parameter "MinimumSsearch," the mobile terminal 4 performs a cell reselection process using cell selection information included in broadcast information transmitted from the base station 30, even after the mobile terminal 4 selects a cell 42 of a WLAN.

Figure 13:
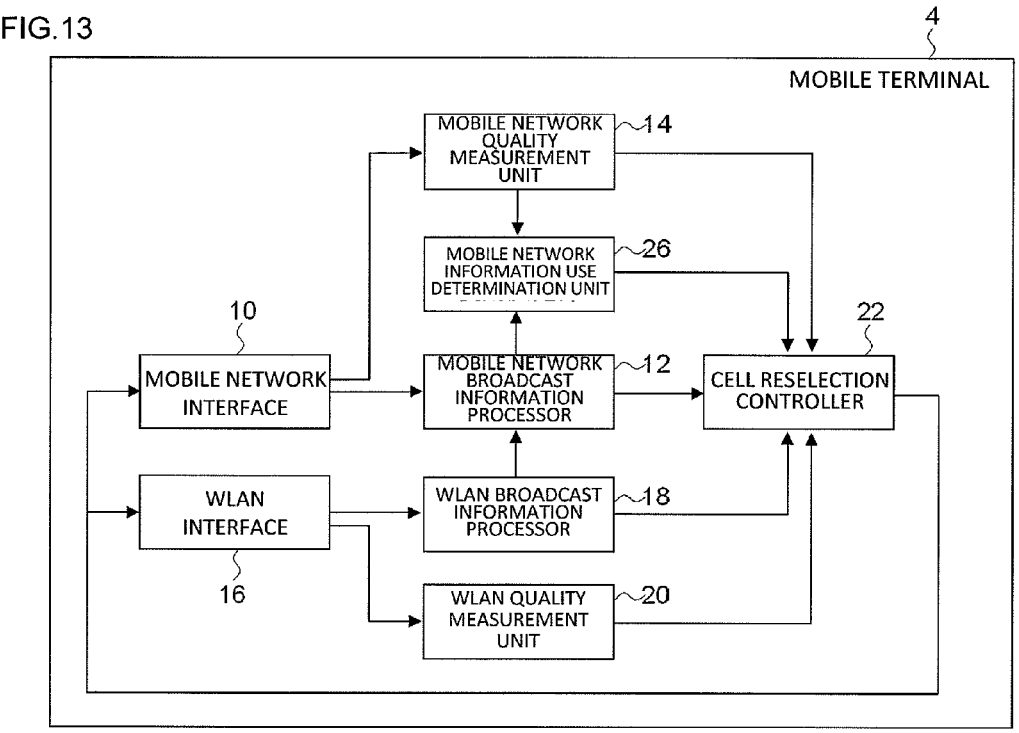
FIG. 13 shows a configuration of a mobile terminal used in the fourth embodiment.
Figure 14:
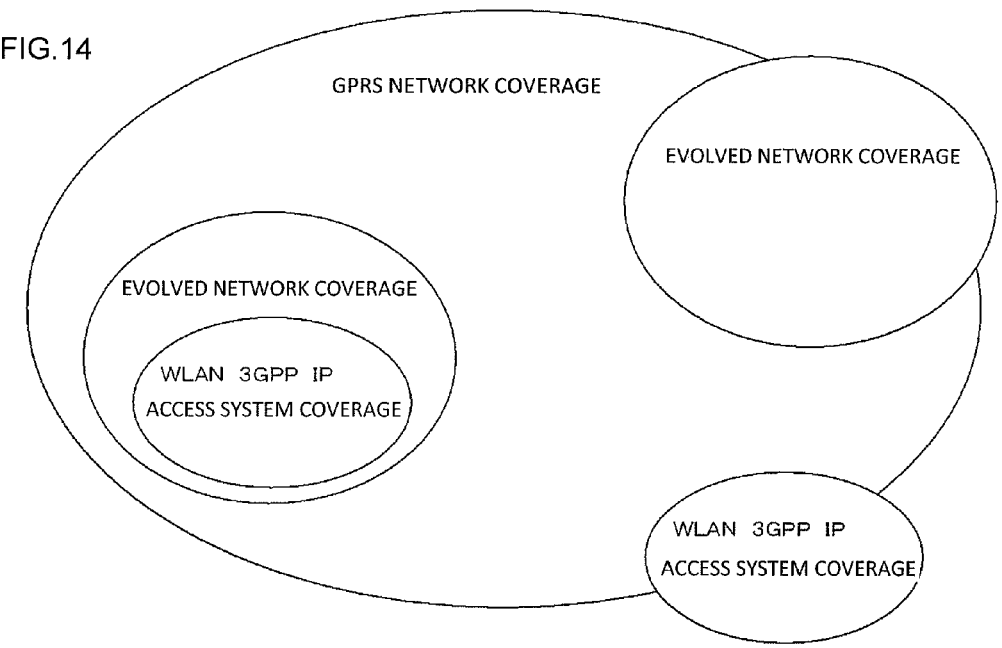
FIG. 14 shows coverages of a plurality of RATs.
Figure 15:
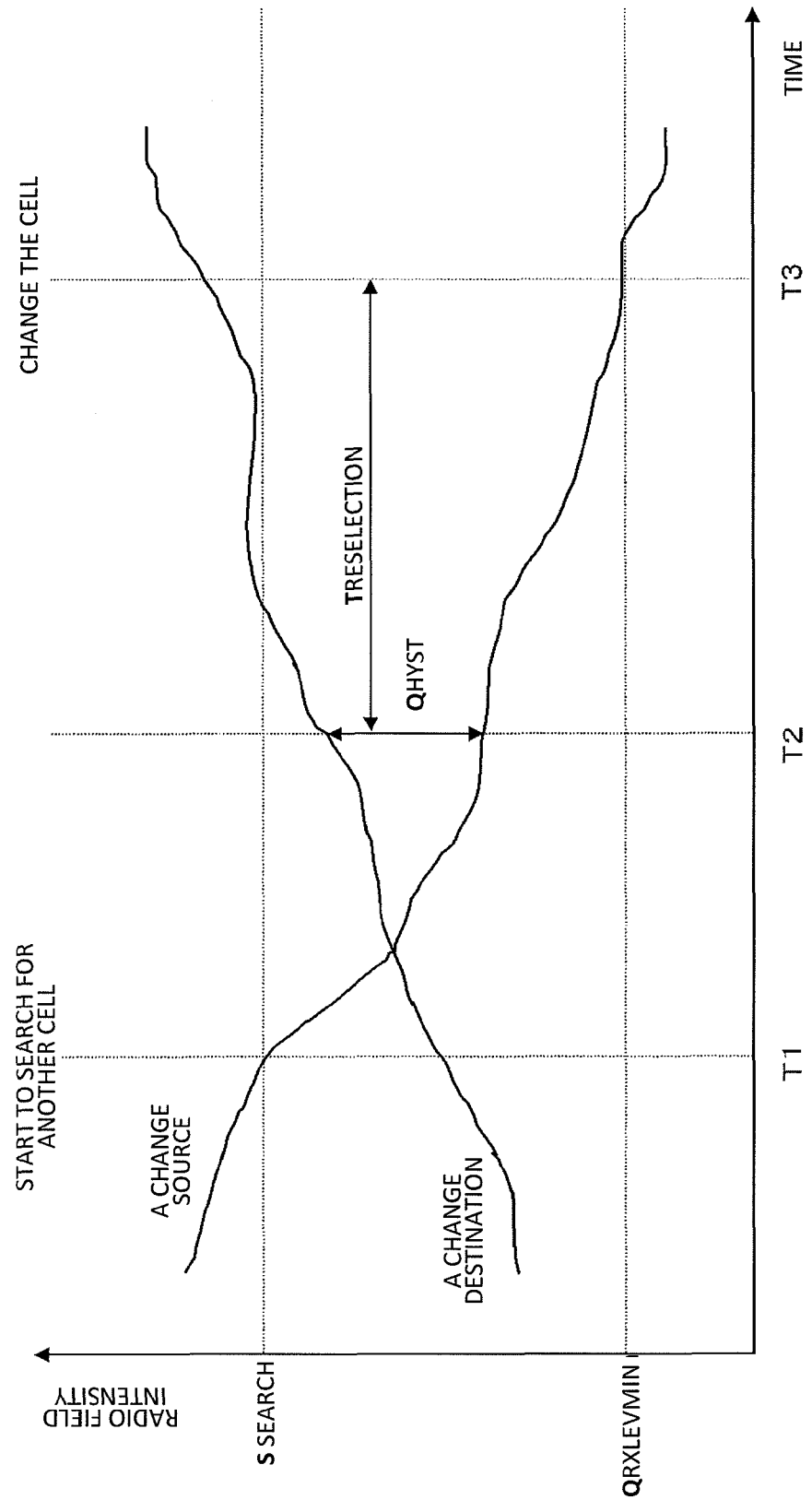
FIG. 15 illustrates parameters used for cell selection.

FIG. 13 shows a configuration of the mobile terminal 4 used in the fourth embodiment. The configuration of the mobile terminal 4 is basically the same as the mobile terminal 1 of the first embodiment, but is different therefrom in that it has a mobile network information use determination unit 26. The mobile network information use determination unit 26 receives the parameter "MinimumSsearch" from the mobile network broadcast information processor 12, compares the received parameter "MinimumSsearch" with a measurement result from the mobile network quality measurement unit 14, and determines whether cell selection information included in broadcast information transmitted from the base station 30 is used to perform a cell selection process or not.

Based on the result determined by the mobile network information use determination unit 26, the cell reselection controller 22 uses the cell selection information included in the broadcast information transmitted from the base station 30 to perform a cell reselection process. The mobile terminal 4 uses the cell selection information included in the broadcast information from the mobile phone network to perform the cell reselection process until the radio field intensity of the mobile phone network becomes equal to or less than the parameter "MinimumSsearch," even after it selects a cell 42 other than the cell 32 of the mobile phone network.

Consequently, the cell selection system of the fourth embodiment can perform a cell reselection process as with when the terminal connects to the mobile phone network, even if the WLAN does not have a sufficient cell reselection function.

While a case has been shown where there are a plurality of communications protocols for a mobile phone network and WLANs, the invention can also be applied to a case where there are a common base station for accommodating all users in a mobile phone network and small home base stations (which are called a Home NodeB, a Home eNodeB, and the like) used for users' home use or the like. For example, a case is conceivable where home base stations are used in a mall, restaurant, campus, corporate, and the like by general public users and each home base station requires terminals to operate differently, and there is the same problem as when a plurality of WLAN APs exist. So, the base station described in the first to fourth embodiments can be applied to the case of home base stations by regarding the mobile phone network described in the first to fourth embodiments as a network having a common base station (or a network) for accommodating all users and by regarding the APs of the WLANs as home base stations (or networks having them).

While there have been described what are at present considered to be preferred embodiments of the invention, it will be understood that various modifications and variations may be made thereto, and it is intended that appended claims cover all such modifications and variations as fall within the true spirit and scope of the invention.

As described above, the invention has a great advantage of being able to restrict the amount of data in broadcast information and is useful, for example, as a technique that is applied to the selection of a cell to be used for communications by a mobile phone supporting a plurality of communications protocols for a mobile phone network and WLANs.

The invention claimed is:

1. A cell selection system for selecting a cell to be used for communications by a mobile terminal in a network, the cell selection system comprising:

a first cell using a first communication protocol;
a plurality of second cells, the plurality of second cells' coverage is under the first cell's coverage and uses a second communication protocol that is different for the first communication protocol; and
a mobile terminal supporting communications using the first and second communication protocols in the first and second cells in the network,
wherein broadcast information having cell selection information is transmitted in the first cell, the cell selection information including cell change judgment parameters having a number of patterns that is less than a number of the second cells, and
the mobile terminal receives the broadcast information of the first cell and broadcast information of one of the second cells; reads the cell selection information from the broadcast information of the first cell; determines, from the number of patterns of parameters included in the read cell selection information, a parameter to be used for making a judgment on cell selection of a second cell based on the broadcast information of the second cell; and judges based on the determined parameter whether to change a communication connection of the mobile terminal from the first cell to the second cell.

2. The cell selection system according to claim 1, wherein the cell selection information includes a common parameter that is commonly used for judgment on the cell selection to all the second cells, and
the mobile terminal judges whether the first cell is changeable to the second cell based on the common parameter and the parameter determined based on the broadcast information of the second cell.

3. The cell selection system according to claim 1, wherein the mobile terminal determines the parameter by information on whether a paging area registration is made with the second cell when in an idle mode, and determines the parameter regardless of the presence of a paging area registration with the second cell when establishing the communication connection.

4. A cell selection system for selecting a cell to be used for communications by a mobile terminal in a network, the cell selection system comprising:
a first cell using a first communication protocol;
a plurality of second cells, the plurality of second cells' coverage is under the first cell's coverage and uses a second communication protocol that is different for the first communication protocol; and
a mobile terminal supporting communications using the first and second communication protocols in the first and second cells in the network,
wherein broadcast information having cell selection information is transmitted in the first cell, the cell selection information including a common parameter that is commonly used for a judgment on cell selection of all the second cells,
in each of the second cells, broadcast information is transmitted including an individual parameter that is individually used for a judgment on cell selection of a second cell, and
the mobile terminal receives the broadcast information of the first cell and the broadcast information of one of the second cells; reads the common parameter from the broadcast information of the first cell; reads the individual parameter from the broadcast information of the second cell; and judges based on the common and individual parameters whether to change a communication connection of the mobile terminal from the first cell to the second cell.

5. The cell selection system according to claim 1, wherein the mobile terminal selects a cell using the cell selection information obtained from the broadcast information of the first cell if the reception quality of the broadcast information of the first cell is a predetermined threshold or higher, even after the mobile terminal selects the second cell.

6. A cell selection method for selecting a cell to be used for communications by a mobile terminal in a network having a first cell using a first communication protocol and a plurality of second cells which are included in the first cell and uses a second communication protocol which is different from that for the first cell, the mobile terminal supporting communications using the first and second communication protocols in both the first and second cells, the cell selection method comprising:
transmitting, in the first cell, broadcast information including cell selection information having cell change judgment parameters with a number of patterns that are less than a number of the second cells;
transmitting broadcast information in the second cells;
receiving in the mobile terminal the broadcast information of the first cell and the broadcast information of one of the second cells;
reading the cell selection information from the broadcast information of the first cell;
determining, from the number of patterns of parameters included in the cell selection information, a parameter to be used for a judgment on cell selection of a second cell based on the broadcast information of the second cell;
judging by the determined parameter whether to change a communication connection of the mobile terminal from the first cell to the second; and
selecting the first cell as the cell to be used for communications by the mobile terminal if the change is judged to be impossible, and selecting the second cell as the cell to be used for communications by the mobile terminal if the change is judged to be possible.

7. A cell selection method for selecting a cell to be used for communications by a mobile terminal in a network having a first cell using a first communication protocol and a plurality of second cells which are included in the first cell and uses a second protocol which is different from that for the first cell, the mobile terminal supporting communications using the first and second communication protocols in both the first and second cells, the cell selection method comprising:
transmitting, in the first cell, broadcast information including cell selection information comprising a common parameter that is commonly used for a judgment on cell selection of all the second cells;
transmitting, in each of the second cells, broadcast information including an individual parameter that is individually used for a judgment on cell selection of a second cell;
receiving in the mobile terminal broadcast information of the first cell and the broadcast information of one of the second cells;
reading the common parameter from the broadcast information of the first cell;
reading the individual parameter from the broadcast information of the second cell;
judging by the common and individual parameters whether to change a communication connection from the first cell to the second cell; and selecting the first cell as the cell to be used for communications by the mobile terminal if the change is judged to be impossible, and selecting the second cell as the cell to be used for communications by the mobile terminal if the change is judged to be possible.

8. A mobile terminal used in a network having a first cell using a first communication protocol and a plurality of second cells which are included in the first cell and uses a second protocol which is different from that for the first cell, the mobile terminal supporting communications using the first and second communications protocols in both the first and second cells, the mobile terminal comprising:
- a first broadcast information receiver for receiving broadcast information of the first cell including cell selection information having cell change judgment parameters with a number of patterns that are less than a number of the second cells;
- a second broadcast information receiver for receiving broadcast information of one of the second cells;
- a broadcast information processor for reading the cell selection information from the broadcast information of the first cell and determining, from the number of patterns of parameters included in the read cell selection information, a parameter to be used for a judgment on cell selection of a second cell based on the broadcast information of the second cell; and
- a cell change controller for judging by the determined parameter whether to change a communication connection of the mobile terminal from the first cell to the second cell.

9. A mobile terminal used in a network having a first cell using a first communication protocol and a plurality of second cells which are included in the first cell and use a second communication protocol which is different from that for the first cell, the mobile terminal supporting communications using the first and second communication protocols in both the first and second cells, the mobile terminal comprising:
- a first broadcast information receiver for receiving broadcast information of the first cell including cell selection information comprising a common parameter that is commonly used for a judgment on cell selection of all the second cells;
- a second broadcast information receiver for receiving broadcast information of one of the second cells including an individual parameter that is individually used for a judgment on cell selection of a second cell;
- a first broadcast information processor for reading the common parameter from the broadcast information of the first cell;
- a second broadcast information processor for reading the individual parameter from the broadcast information of the second cell; and
- a cell change controller for judging by the common and individual parameters whether to change a communication connection of the mobile terminal from the first cell to the second cell.

10. The cell selection system according to claim 2, wherein the mobile terminal determines the parameter by information on whether a paging area registration is made with the second cell when in an idle mode, and determines the parameter regardless of the presence of a paging area registration with the second cell when establishing the communication connection.

11. The cell selection system according to claim 2, wherein the mobile terminal selects a cell using the cell selection information obtained from the broadcast information of the first cell if the reception quality of the broadcast information of the first cell is a predetermined threshold or higher, even after the mobile terminal selects the second cell.

12. The cell selection system according to claim 3, wherein the mobile terminal selects a cell using the cell selection information obtained from the broadcast information of the first cell if the reception quality of the broadcast information of the first cell is a predetermined threshold or higher, even after the mobile terminal selects the second cell.

13. The cell selection system according to claim 4, wherein the mobile terminal selects a cell using the cell selection information obtained from the broadcast information of the first cell if the reception quality of the broadcast information of the first cell is a predetermined threshold or higher, even after the mobile terminal selects the second cell.

14. The cell selection system according to claim 1, wherein the mobile terminal determines the parameter by information on whether a paging area registration is made with the second cell or not.

15. The cell selection system according to claim 2, wherein the mobile terminal determines the parameter by information on whether a paging area registration is made with the second cell or not.

* * * * *